United States Patent [19]

Bader et al.

[11] 3,929,848

[45] Dec. 30, 1975

[54] CHROME-COMPLEXING AZOMETHINE DYES

[75] Inventors: Henry Bader, Newton Center, Mass.; Edwin G. Jahngen, Jr., Burlington, Vt.

[73] Assignee: Polaroid Corporation, Cambridge, Mass.

[22] Filed: July 19, 1971

[21] Appl. No.: 164,103

Related U.S. Application Data

[63] Continuation-in-part of Ser. No. 47,174, June 17, 1970, abandoned.

[52] U.S. Cl. .................. 260/438.5 R; 96/29; 96/93
[51] Int. Cl.² .......................................... C07F 11/00
[58] Field of Search ................. 260/438.5 R, 429 C

[56] References Cited
UNITED STATES PATENTS

| | | |
|---|---|---|
| 2,116,913 | 5/1938 | Schmidt et al. ................. 260/429 C |
| 2,753,344 | 7/1956 | Schmidt et al. ........... 260/438.5 R X |
| 3,398,170 | 8/1968 | Cyba ............................ 260/438.5 R |
| 3,597,200 | 8/1971 | Idelson ......................... 260/438.5 R |

OTHER PUBLICATIONS

Rollinson et al., Inorganic Chemistry, Vol., No. 2, pp. 281–285 (1962).

*Primary Examiner*—Helen M. S. Sneed
*Attorney, Agent, or Firm*—John P. Morley

[57] ABSTRACT

An improved method for producing 1:1 chrome-complexed azomethine dyes. Essentially, the method involves chrome-complexing an axomethine dye with a chroming reagent prepared by dehydrating a chrome-containing compound in the presence of a dipolar solvent.

31 Claims, No Drawings

CHROME-COMPLEXING AZOMETHINE DYES

CROSS REFERENCE TO RELATED APPLICATIONS

This application is a continuation-in-part of application Ser. No. 47,174 filed June 17, 1970 now abandoned.

BACKGROUND OF THE INVENTION

Part 1. The Field of the Invention

This invention relates to 1:1 chrome-complexed azomethine dyes and 1:1 chrome-complexed azomethine dye dedevelopers, and more particularly, to an improved method for preparing such dyes and dye developers.

Part 2. Description of the Prior Art

The commonly assigned, copending application of Elbert M. Idelson, Ser. No. 830,499, filed June 4, 1969 now U.S. Pat. No. 3,597,200, relates to 1:1 chrome-complexed azomethine dyes and their use in photographic products, processes and compositions of the type described and claimed in U.S. Pat. No. 2,983,606 to Howard G. Rogers.

Also, commonly assigned, copending application of Paul S. Huyffer and Arthur B. Goulston, Ser. No. 830,480, filed June 4, 1969 now abandoned, relates to a particular novel class of 1:1 chrome-complexed azomethine dyes and more particularly to complexes of yellow azomethine dyes of the formula:

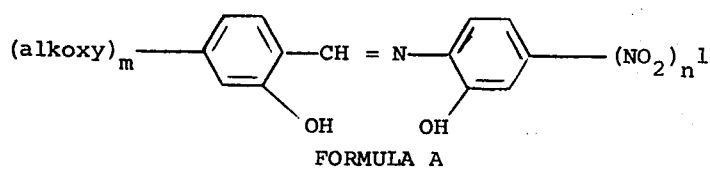

FORMULA A wherein the alkoxy moiety contains from 1–8 carbon atoms to provide an alkoxy moiety which can be methoxy, ethoxy, propoxy, isopropoxy, butoxy, isobutoxy, pentoxy, 3-methylbutoxy, hexoxy or octoxy while $n^1$ and m are each positive integers from 1–2.

Azomethine dyes of Formula A are prepared by reacting an ortho-hydroxy benzaldehyde with an o-hydroxynitro-aniline as follows:

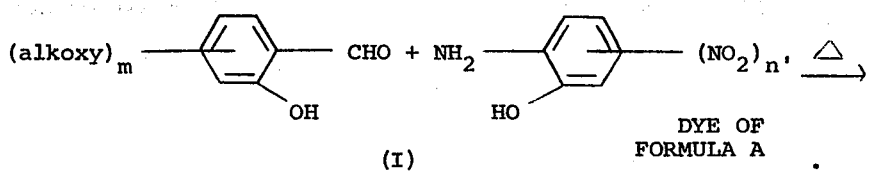

(I)

The ortho-hydroxy benzaldehydes employed in the above reaction can be conveniently prepared by initially reacting phloroglucinol (1,3,5-trihydroxybenzene) with an alkanol to provide the desired dialkoxy phenol as follows:

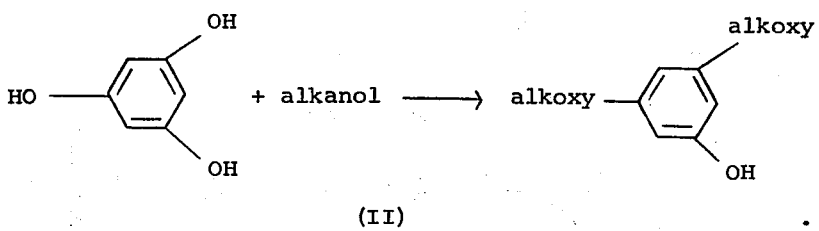

(II)

An especially preferred method for preparing the intermediate dialkoxy phenol is disclosed in commonly assigned copending application Ser. No. 24,005 of Henry Bader and Edwin G. Jahngen, Jr., filed Mar. 30, 1970, now U.S. Pat. No. 3,770,833. In accordance with the method disclosed there, high yields of dialkoxy phenol intermediate can be obtained by refluxing phloroglucinol with the appropriate alcohol in the presence of an azeotropic media and a strong acid. The strong acids are those having a negative Hammett acidity function $H_o$ value as measured in a five molar aqueous solution and include perchloric, fluoboric and hexafluorophosphoric acids.

In accordance with the present state of the art, the intermediate dialkoxyphenol is reacted with Vilsmeier reagent, e.g., dimethyl formamide-phosphoryl chloride (or phosgene) to produce the desired ortho-hydroxy benzaldehyde as follows:

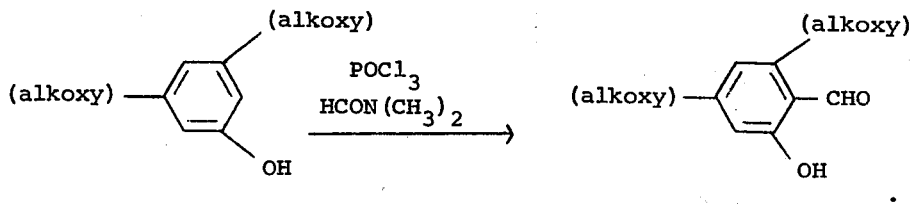

III

As previously stated, an ortho-hydroxy benzaldehyde is reacted with an amine as in the foregoing reaction I to provide the azomethine dye of Formula A.

It has heretofore been suggested that chelatable azomethine dyes can be chrome-complexed by reacting azomethine dyes of Formula A with a chrome-containing compound, e.g., an inorganic chromic salt such as chromic chloride. In the synthesis known to the art, the reaction is conducted in a protic solvent such as methanol and proceeds as follows:

As will be appreciated from the above, the chrome-complexing of azomethine dyes of Formula A provides two distinct 1:1 chrome-complexed azomethine dye products which are designated as Intermediate B and Intermediate C. Intermediate B is a species which is cationic in nature; while Intermediate C is a species which is substantially neutral. In the synthesis presently

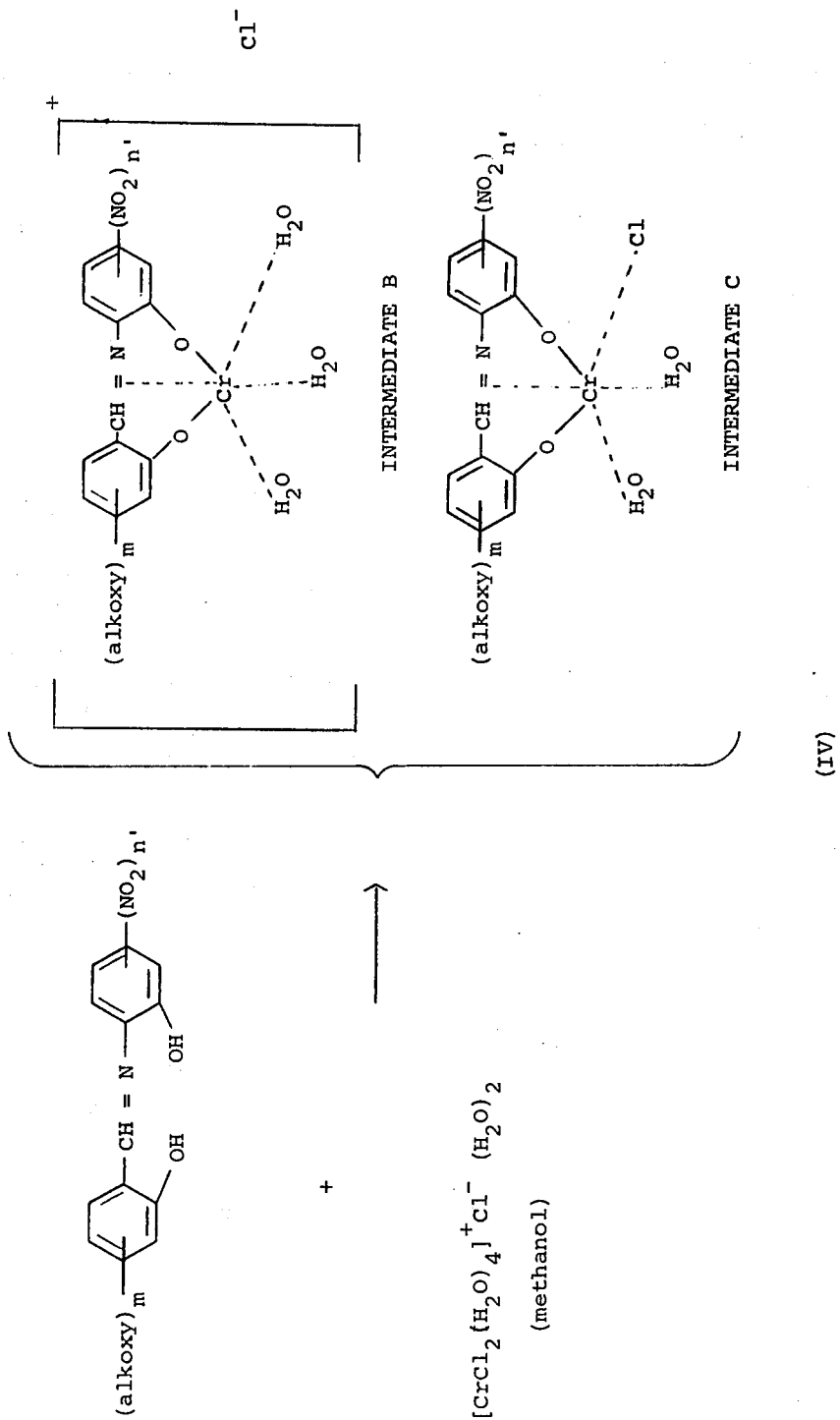

employed in the art, e.g., reaction (IV), Intermediate C, the neutral species, is the predominant product.

As is disclosed in the aforementioned copending applications, 1:1 chrome-complexed azomethine dyes, e.g., Intermediates B and C, can be reacted with a ligand-developer, e.g., a $\beta$-hydroxy-$\alpha,\beta$-unsaturated carbonyl ligand containing a dihydroxyphenyl silver halide developing substituent or a protected derivative thereof to form 1:1 chrome-complexed azomethine dye developers conforming to the following formulae:

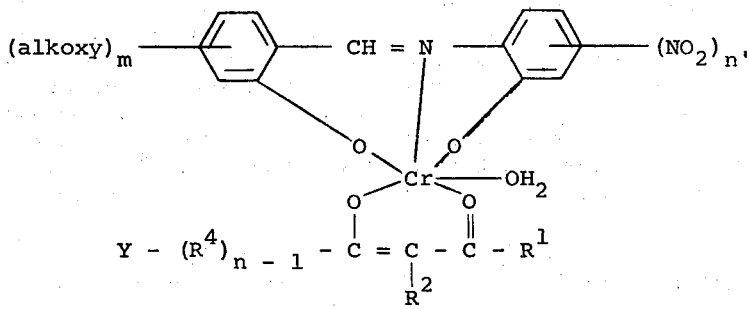

FORMULA D

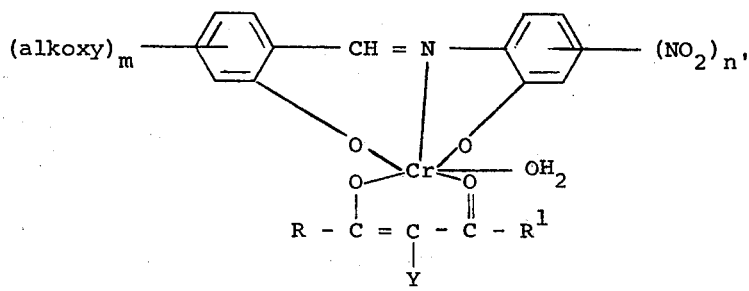

FORMULA E

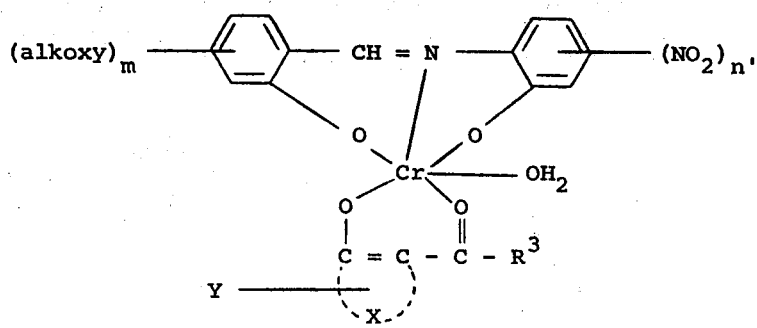

FORMULA F

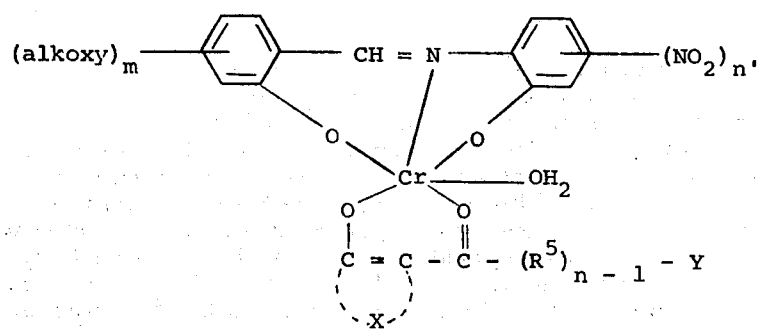

FORMULA G wherein the alkoxy moiety comprises 1–8 carbon atoms and preferably 1–4; m and n' are as defined before; R and R¹ each are lower alkyl, lower alkoxyalkyl, lower fluoroalkyl, lower alkylamine, phenyl or phenylamino; R² is hydrogen, lower alkyl or phenyl; R³ is lower alkyl, hydroxy or hydrogen; R⁴ is lower alkylene, phenylene or a phenylamino radical; R⁵ is lower alkylene; Y is a radical comprising a paradihydroxyphenyl silver halide developer substituent; X represents the atoms necessary to complete a five or six member aliphatic ring or a benzene ring; and n is a positive integer from 1–2.

The alkyl moieties of the above-mentioned substituents preferably contain 1–4 carbon atoms.

The most preferred 1:1 chrome-complexed azomethine dye developers within the above formulae are those of the formula:

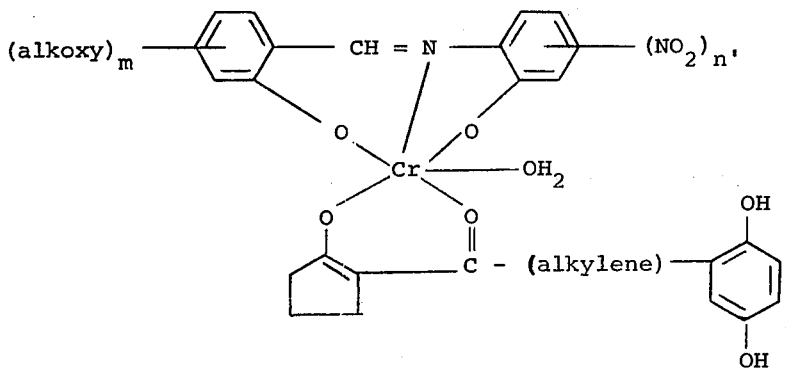

FORMULA H wherein the alkoxy moieties comprise 1–4 carbon atoms, m is 2, n' is 1 and the alkylene moiety contains 1–4 carbon atoms, i.e., methylene, ethylene, propylene, isopropylene, butylene or isobutylene.

The above-discussed state of the art synthesis of both the 1:1 chromium-complexed azomethine dyes and 1:1 chrome-complexed azomethine dye developers is not as commercially attractive as desired. For example, in the chrome-complexing of the azomethine dyes, e.g., Reaction IV, long reaction times are involved and overall yields are low. Oftentimes, reaction times of 72 hours are required to obtain yields in excess of 50%. Also, the present chrome-complexed products of Reaction IV undergo reaction with the ligand-developers to provide 1:1 chrome-complexed azomethine dye developers of an overall quality which could be improved. It is presently believed that the lack of the desired quality of 1:1 chrome-complexed azomethine dye developers produced in accordance with methods heretofore known to the art is a direct result of the increased amounts of the neutral Intermediate C in the 1:1 chrome-complexed products of Reaction IV. The present invention is addressed to the above discussed outstanding problems in the art and provides a process for producing 1:1 chrome-complexed azomethine dyes and dye developers of improved quality in increased yields and at accelerated reaction rates.

SUMMARY OF THE INVENTION

The present invention essentially involves the step of chrome-complexing an azomethine dye with a chroming reagent which is prepared by dehydrating a chrome-containing compound in the presence of a dipolar solvent. By chrome-complexing the azomethine dyes in the presence of the chrome reagents of the present invention, unexpectedly higher yields of chrome-complexed azomethine dyes are obtained at accelerated reaction rates. Moreover, the predominant chrome-complexed product obtained in accordance with the process of the present invention is the aforementioned cationic species, i.e., Intermediate B, which, as previously described, conforms to the following formula:

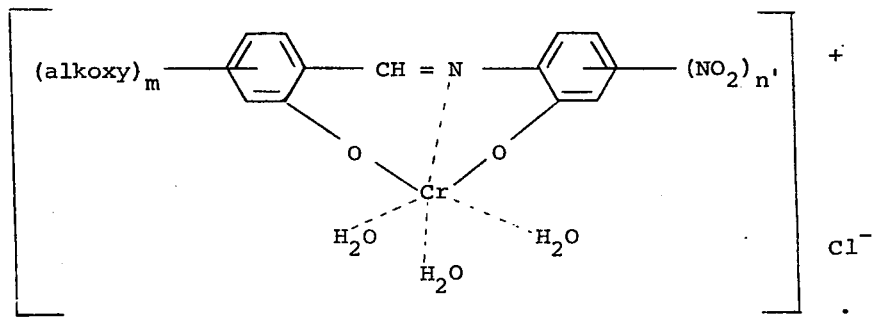

The predominance of the cationic specie, i.e., Intermediate B, in the chrome-complexed azomethines produced in accordance with the process of the present invention is considered important and apparently explains the high quality of 1:1 chrome-complexed azomethine dye developers obtained by reacting the chrome-complexed products of the present invention with the dye developers mentioned before. This explanation is consistent with the thesis of the article entitled *Ligand Substitution Dynamics* by H. B. Gray and C. H. Longford in *Chemical and Engineering News*, Apr. 1, 1968, to the effect that ligand reactions with metal ions such as $Cr^{III}$ are facilitated if the metal carries a formal charge. Accordingly, two distinct advantages are initially presented by the process of the present invention as compared to the chrome-complexing process presently employed in the art. First, 1:1 chrome-complexed azomethine dyes can be obtained in increased yields and at faster reaction rates by chrome-complexing the azomethine dye with the chrome reagents of the present invention. Secondly, the chrome-complexed azomethine dyes produced in accordance with the present invention undergo reaction with dye developers to provide high quality 1:1 chrome-complexed azomethine dye developers.

An additional advantage of the present invention involves the discovery that the chroming reagents of the present process can be employed to chrome-complex azomethine dyes of the following formula:

dye of the formula:

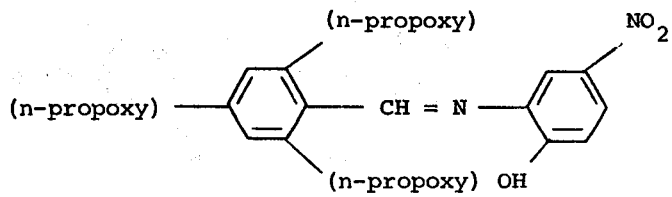

has not been successfully chrome-complexed in accordance with the practice of the prior art method.

The above discussed advantages obtained in accordance with the practice of the present invention in the production of chrome-complexed azomethine dyes and chrome-complexed azomethine dye developers as well as other advantages of the invention will be apparent by reference to the following detailed description of the invention.

DETAILED DESCRIPTION OF THE INVENTION AND PREFERRED EMBODIMENTS THEREOF

As stated, the present invention essentially involves the step of chrome-complexing an azomethine dye with a chroming reagent produced by dehydrating a

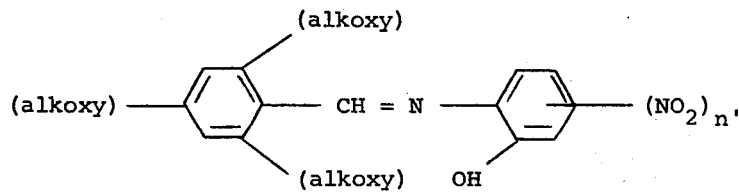

FORMULA I where alkoxy and $n'$ are as defined before, which dyes are described and claimed in the copending applications of Elbert M. Idelson and Paul S. Huyffer, Ser. No. 47,173 filed June 17, 1970.

As mentioned in the Description of the Prior Art, the chrome-complexed azomethine dyes produced heretofore were produced by chrome-complexing azomethine dyes of Formula A with a chromic salt in the presence of protic solvents such as methanol or methyl cellosolve (See Reaction (IV), page 5). However, as will be demonstrated hereinafter in Examples 3 and 4, azomethine dyes of Formula I, for example, an azomethine chrome-containing compound in the presence of a dipolar solvent.

Representative azomethine dyes which can be suitably employed in accordance with the practice of the present invention include azomethines of the following formula:

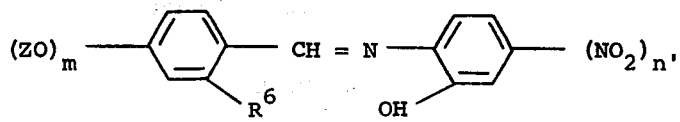

FORMULA J wherein Z is hydrogen or an alkyl radical having from 1–8 carbon atoms, $m$ and $n$ are as defined before and $R^6$ is OH or alkoxy having 1–8 carbon atoms.

When $R^6$ is OH and Z is alkyl, azomethines contemplated by this invention include azomethines of Formula A, and mention may be made of the following:

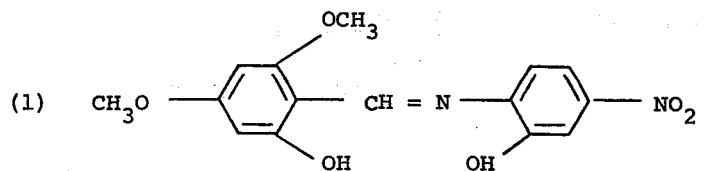

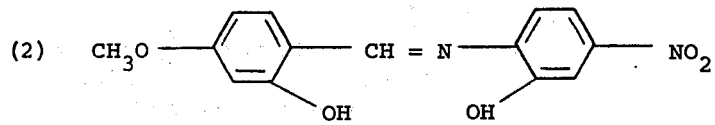

(3) 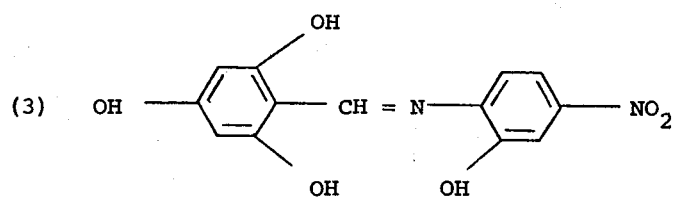
(4) 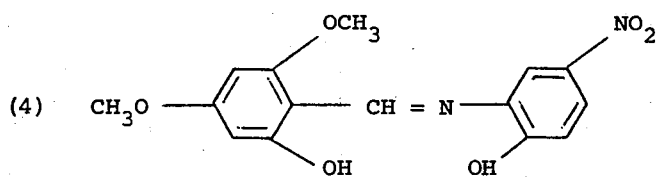
(5) 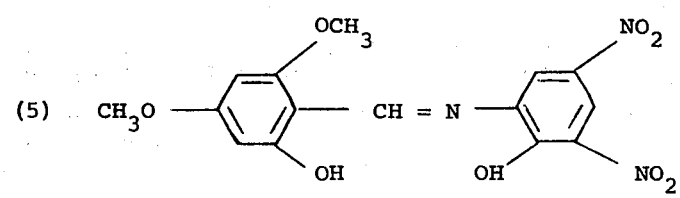
(6) 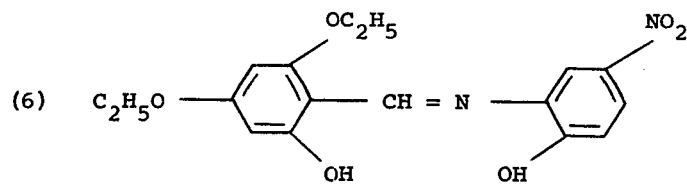
(7) 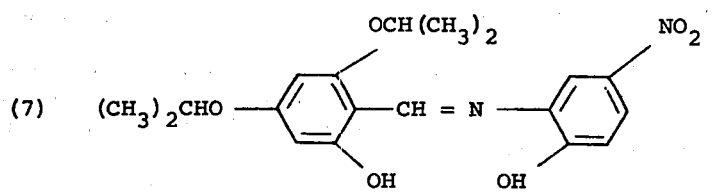
(8) 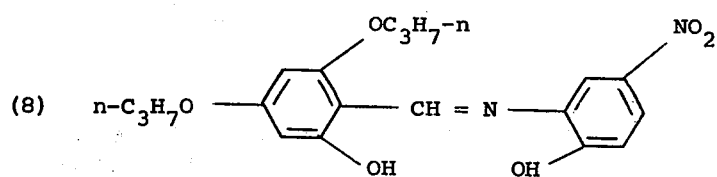
(9) 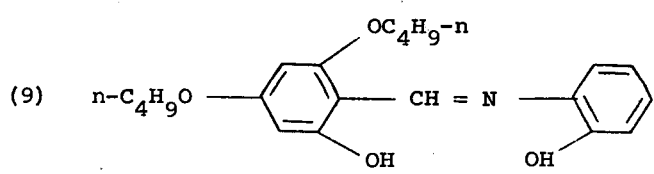
(10) 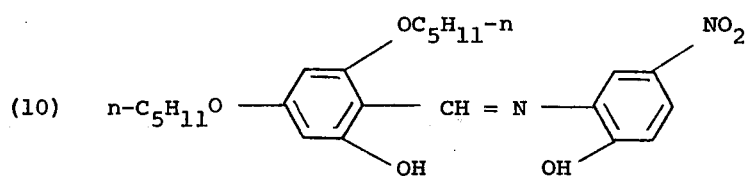

(11) 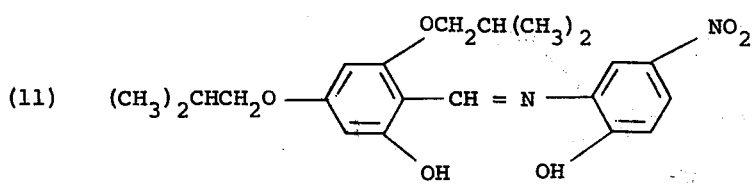

(12) 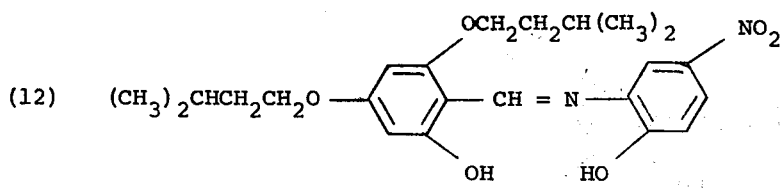

(13) 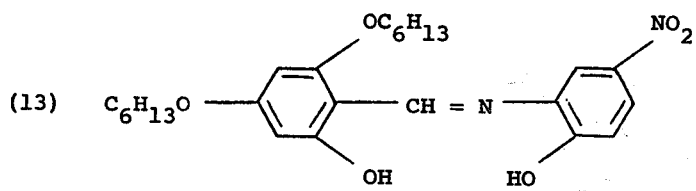

(14) 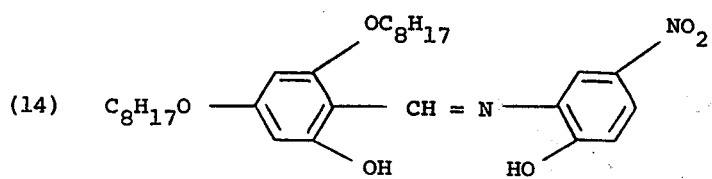

In addition to those mentioned above, azomethines which can be suitably employed to prepare chromium complexes in the practice of the present invention further include those azomethines of the following formula which as heretofore mentioned are described and claimed in copending application Ser. No. 47,173:

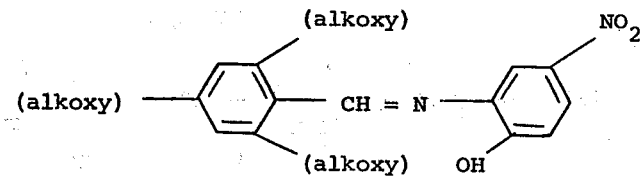

FORMULA I

Specific azomethines conforming to Formula I include the following:

(15) 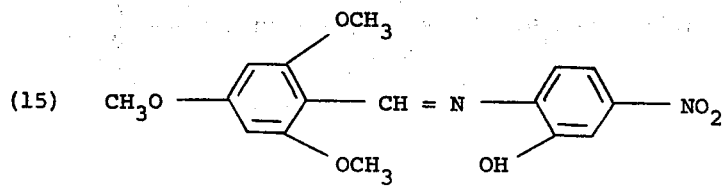

(16) 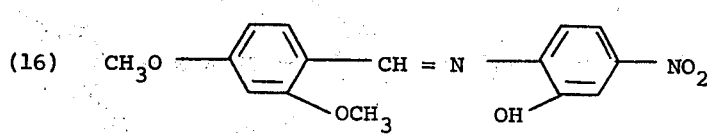

(17) 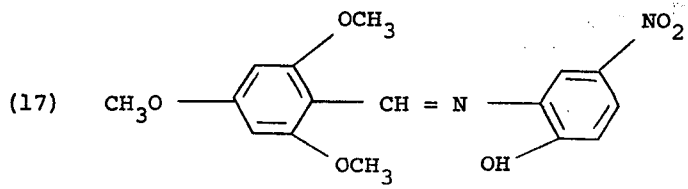
(18) 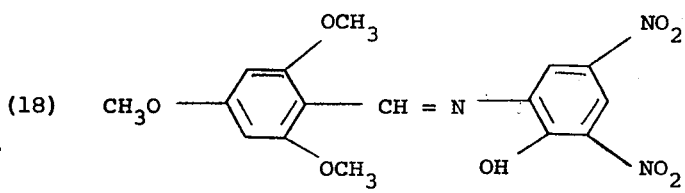
(19) 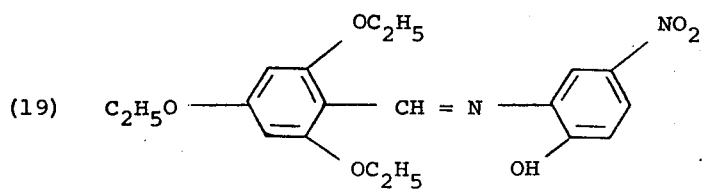
(20) 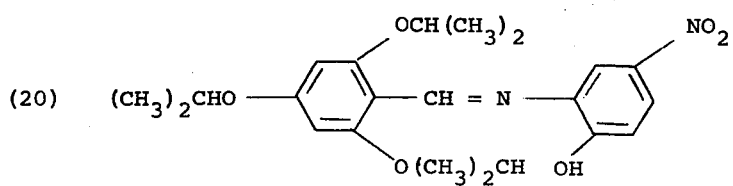
(21) 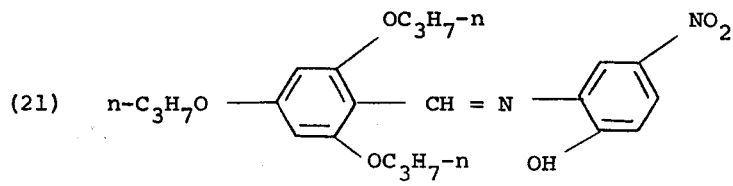
(22) 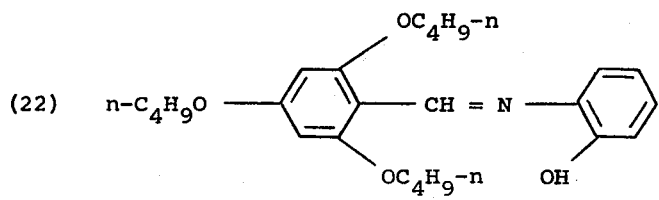
(23) 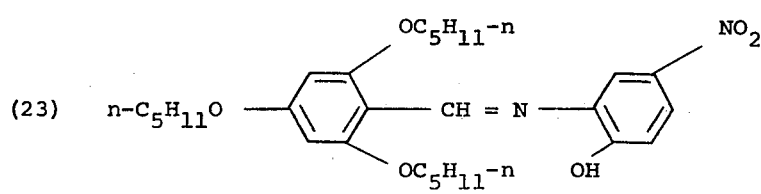

(24) 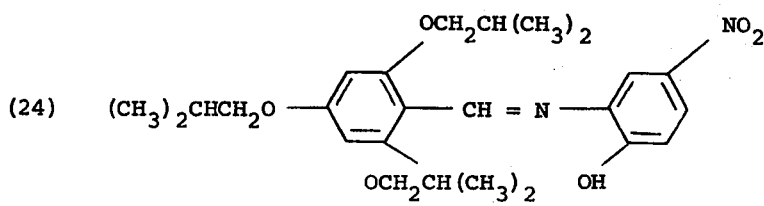

(25) 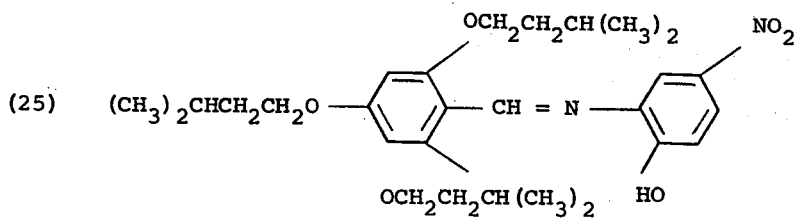

(26) 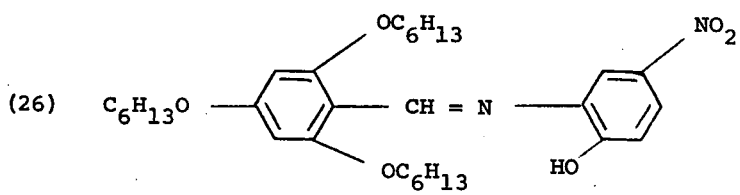

(27) 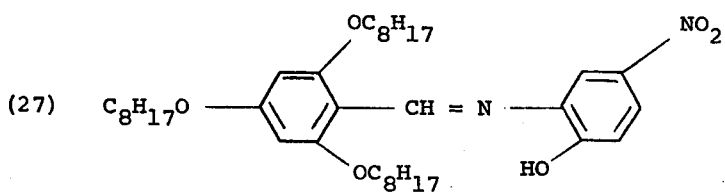

In accordance with the practice of the present invention, the azomethine dyes of Formula J are chrome-complexed with a chroming reagent produced by dehydrating a chrome-containing compound in the presence of a dipolar solvent.

The preferred chrome-containing compounds useful in preparing the chrome reagent of the present invention are the hydrated organic and inorganic chrome salts of the following formula:

$$CrA_3$$

wherein A is a suitable anion moiety such as halogen, nitrate, acetate, oxalate, oxide, orthophosphate, sulfate, sulfite and tartrate. Especially preferred compounds of the above formula are those wherein A is halogen, and especially chlorine.

The chroming reagents of the present invention are prepared by dehydrating a chrome-containing compound in the presence of a particular class of dipolar solvents. Broadly, the dipolar solvents suitable in the practice of the present invention are those containing an unsaturated dipolar bond attached to an electron donating group and particularly those conforming to the following formulae:

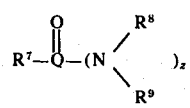

FORMULA K
or

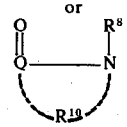

FORMULA L where $R^7$ is hydrogen or alkyl, e.g., having from 1-8 carbon atoms; Q is carbon, phosphorus or sulfur; $R^8$ and $R^9$ can be hydrogen, alkyl or aryl, e.g., phenyl or substituted phenyl; z is the integer 1, 2 or 3 and $R^{10}$ represents the atoms necessary to complete a 5 or 6 membered ring which can be substituted or unsubstituted. Especially preferred dipolar solvents conforming to the above formula are:

dimethylformamide 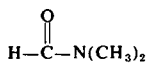

dimethylacetamide 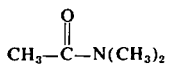

diphenylformamide 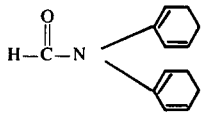

2-pyrrolidinone 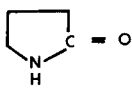

1-methyl-2-pyrrolidinone 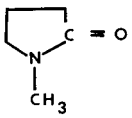

2-piperidone 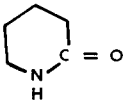

1-methyl-2-piperidone 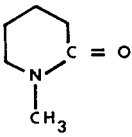

hexamethylphosphoramide 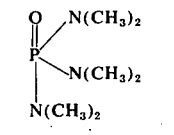

N,N-diethyl methylsulfinamide 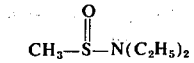

Those skilled in the art will recognize that solvents of Formulae K and L denote a specific group of dipolar solvents within the generic class. The effectiveness of this specific group within the genus is considered surprising and unexpected. For example, dimethylsulfoxide is perhaps the best known dipolar solvent and is routinely used in nucleophilic displacements where it is oftentimes superior in performance to dimethylformamide. However, although a chromium-containing compound can be dehydrated in the presence of dimethylsulfoxide, nevertheless, the resulting dehydrated specie does not function as a suitable chrome-complexing reagent for azomethine dyes of the present invention. Another unexpected feature of the solvents of Formulae K and L is that they need not necessarily be aprotic. For example, pyrolidinone is a suitable solvent in the practice of the present invention.

The preferred dehydration method for preparing the chrome reagents of the present invention is described in the article entitled *Chromium III - Amide Complex Compounds* by Carl L. Rollinson and Rudolf C. White, Inorganic Chemistry, 1, 281 (1962). In accordance with the method disclosed there, a chrome-containing compound and dipolar aprotic solvent are heated together in the presence of an appropriate azeotropic medium such as benzene, toluene or cyclohexane until dehydration is complete. The chroming reagent can be recovered as a solid, such as by precipitation or evaporation of the solvent and can be stored until used in the chroming reaction. Since the chroming reagents are soluble in diverse solvents including alcohols, such solvents may be suitably employed as chrome-complexing media. However, in the preferred practice of the present invention, the soluble chroming reagents are retained in the dehydration solution and the desired azomethine dye is added directly thereto.

The chroming reagents of the present invention produced by dehydrating a chrome-containing compound in the presence of a solvent of Formulae K and L conform to the following formula:

[ Cr $M_p$ $A_3$ ]

where M is a solvent of Formulae K and L or mixtures thereof, A is an anion as defined before, and p represents an integer from 1–6 and is usually 3 or 4. It should be understood that the above formula is indicative merely of the constituents of the chroming reagent and inasmuch as the exact molecular arrangement and/or configuration is not precisely known, the formula is not limited to any particular molecular configuration. For example, fromm the theory of electrons and related considerations, the chroming reagents could conceivably have any of the following configurations or arrangements: [ Cr $A_3$ $M_p$ ], [ Cr $A_2$ $M_p$ ]A, [ Cr A $M_p$ ]$A_2$, [ Cr $M_p$ ]$A_3$. Accordingly, representative molecular configurations for specific chrome reagents of the present invention are considered to be as follows:

[CR{HCON(CH$_3$)$_2$}$_3$Cl$_3$]
[CR{CH$_3$CON(CH$_3$)$_2$}$_3$Cl$_3$]
[CR{CH$_2$(CH$_2$)$_2$CONCH$_3$}$_4$Cl$_2$]Cl

The specific reaction conditions involved in chrome-complexing the azomethine dyes with the chroming reagents of the present invention can vary. For example, the maximum temperatures employed are obviously limited by such factors as the decomposition temperature of the azomethine dye and boiling point of any solvent employed. Keeping such limitations in mind, higher temperatures are preferred and representative temperatures are those between about 20° C. to about 90° C. Also, superatmospheric pressures can be employed if desired. In any event, it can be said that the specific reaction conditions, e.g., temperature and pressure, will be apparent to those skilled in the art and such reaction conditions per se accordingly comprise no part of this invention.

The invention as well as manners of practicing same and the advantages thereof will be more fully appreciated by reference to the following non-limiting, illustrative Examples.

EXAMPLE 1

This Example illustrates the preparation of the 1:1 chrome-complexed 2,4-di-n-propoxybenzald(2-oxy-5-nitrophenyl)imine (Formula 8) in accordance with the synthesis known to the art. The synthesis can be illustrated as follows:

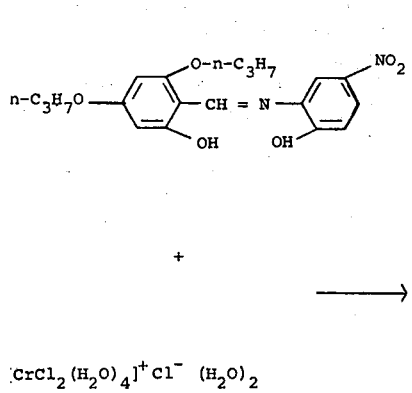

IV
(Page 4)

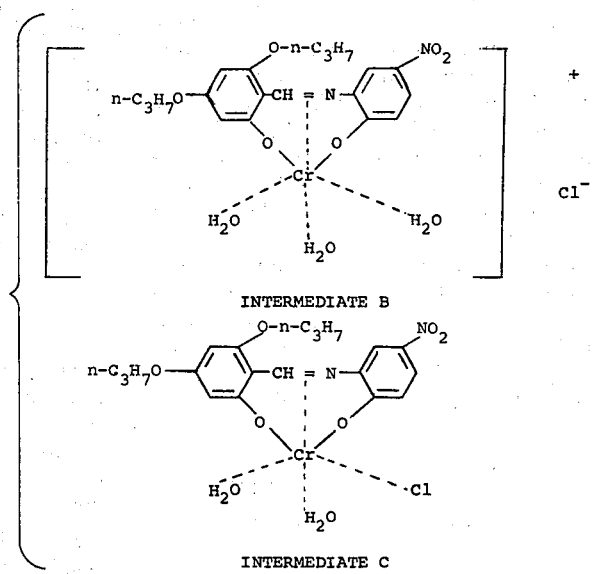

A solution of 32.0 gms. (0.12 m.) of chromic chloride hexahydrate and 22.4 gms. (0.06 m.) of 2-oxy-4,6-di-n-propoxybenzald(2-oxy-5-nitrophenyl)imine (Formula 8) in one liter of methanol was stirred under reflux for 72 hours. The reaction mixture was then cooled to room temperature and added in a steady stream to 10 l. of water and two liters of concentrated hydrochloric acid.

The product was washed with four liters of water and dried at room temperature in vacuum oven, yielding 14.8 gms. (51.8% yield) of dark-brown solid. The product absorbed at a $\lambda_{max}^{MeCell}$ 450 m$\mu$, $\epsilon = 15,070$. The paper chromatography of the product showed a definite center and diffused area, a band with $R_f$ of .66 and a blue ring at the solvent front. The electrophoresis showed some positive and negative species, but the major portion of the material was neutral.

EXAMPLE 2

This Example illustrates the preparation of the 1:1 chrome-complexed 2,4-di-n-propoxy-benzald(2-oxy-5-nitrophenyl)imine (Formula 8) in accordance with the synthesis of the present invention. The synthesis can be illustrated as follows:

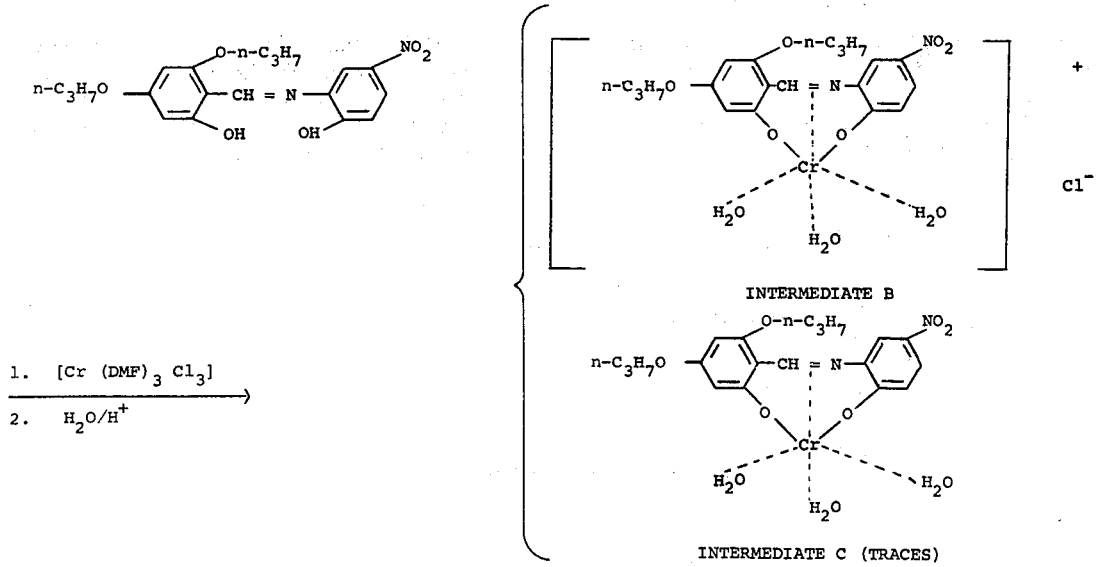

(V)

A solution of 37.4 g. (0.14 m.) of CrCl$_3 \cdot$ 6H$_2$O in 250 ml. of N,N-dimethylformamide, and 100 ml. of benzene was stirred under reflux in a 1-liter flask while water was azeotropically separated into a 20-ml. Dean Stark trap. The solution changed color from green to purple. Refluxing was continued for about 2 hr. until no more water came over. The solution was cooled to 60° C. and a solution of 50 g. (0.133 m.) of 2-oxy-4,6-di-n-propoxybenzald(2-oxy-5-nitrophenyl)imine (Formula 8) in 250 ml. of N,N-dimethylformamide (preheated on a steam bath to effect solution), was added in a steady stream over 5-min. period with stirring. The stirred reaction mixture was kept at 60° C. for 24 hrs.

The reaction mixture was cooled to room temperature and added dropwise to 8 l. of water. The 1.6 l. of conc. hydrochloric acid was added in a slow stream over a period of 30 min. with vigorous stirring. The product was filtered and washed with 2 l. of water until acid free, and dried at 60° C. in vacuum oven, yielding 67.3 g. (98.5%) of a light-brown solid. Thin layer chromatography (TLC) gave a major spot at R$_f$ 0 and two minor spots at R$_f$ 0.14 and 0.98. Electrophoresis gave a major positive band, a minor neutral band and a very slight negative band. Visible absorption:

| | | |
|---|---|---|
| MeCell λmax | 445 mµ | $\epsilon$ = 15,500; |
| MeCell λmax | 410 mµ | $\epsilon$ = 14,400; |
| MeCell λmax | 390 mµ | $\epsilon$ = 14,300. |

A comparison of Examples 1 and 2 reveals that the chrome-complexing synthesis of the prior art (Example 1) provides a yield of 51.8% after 72 hours whereas the process of the present invention (Example 2) provides a yield of 98,5% after 24 hours. Also, a comparison of the electrophoresis data reveals that the product of Example 1 is predominately neutral whereas the product of Example 2 is predominately cationic. This feature is considered important and possibly accounts for the improved quality of azomethine dye developers produced by reacting the developers with the chrome-complexed products of the present invention.

EXAMPLE 3

The following Example illustrates an attempt to prepare the 1:1 chrome-complexed 2,4,6-tri-n-propoxybenzald(2-oxy-5-nitrophenyl)imine (Formula 21) in accordance with the systhesis known to the art. The synthesis can be illustrated as follows:

[ CrCl$_2$(H$_2$O)$_4$ ] Cl$^-$(H$_2$O)$_2$ in methanol.

A solution of 8.0 gms. (0.03 m.) of chromic chloride hexahydrate and of 6.2 gms. (0.015 m.) of 2,4,6-tri-n-propoxybenzald(2-oxy-5-nitrophenyl)imine (Formula 21) in 250 ml. of methanol was stirred under reflux for 72 hours.

The reaction mixture was cooled to room temperature and added in a steady stream to one liter of water and 250 ml. concentrated HCl. The product was slurried with 9 gms. of Celite and filtered over a 6-gm. cake of Celite and dried at room temperature in vacuum oven, yielding 5.1 gms. of a dark oil, which exhibited a λ max. at 350 mµ in methyl cellosolve, showed no absorption at 445, 420, and 400 mµ, and showed none of the bands on paper and thin-layer chromatography characteristic of the chromed dye.

EXAMPLE 4

The following Example illustrates another attempt to prepare the 1:1 chrome-complexed 2,4,6-tri-n-propoxy-benzald(2-oxy-5-nitrophenyl)imine (Formula 21) in accordance with the synthesis of Example 3, but using methyl cellosolve as solvent rather than methanol.

A solution of 4.0 gms. (0.015 m.) of chromic chloride hexahydrate (CrCl$_3 \cdot$ 6H$_2$O) and of 3.8 gms. (0.007 m.) of the 2,4,6-tri-n-propoxy-benzald(2-oxy-5-nitrophenyl)imine (Formula 21) in 250 ml. of methyl cellosolve was stirred and heated at 100° C. for 72 hours. The reaction mixture was then cooled to room temperature and added in a steady stream to 500 ml. of water and 125 ml. concentrated HCl. The product was slurried with 9 gms. of Celite and filtered over a 6-gm. cake of Celite and dried at room temperature in vacuum oven, yielding 2.2 gms. of an oil. There was no evidence of the desired product by paper or thin-layer chromatography or by visible absorption.

EXAMPLE 5

This Example illustrates the preparation of the 1:1 chrome-complexed 2,4,6-tri-n-propoxybenzald-(2-oxy-5-nitrophenyl)imine (Formula 21) in accordance with the synthesis of the present invention. The synthesis can be illustrated as follows:

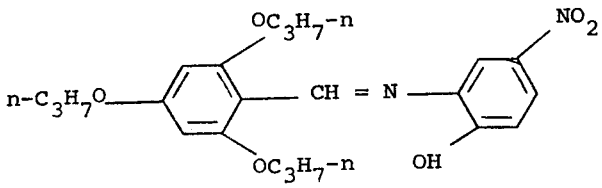

+ ⟶ No product

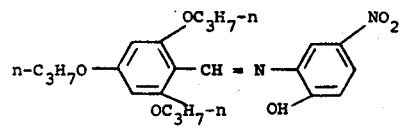

1. [Cr (DMF)$_3$ Cl$_3$]
   ———————→
2. H$_2$O/H$^+$

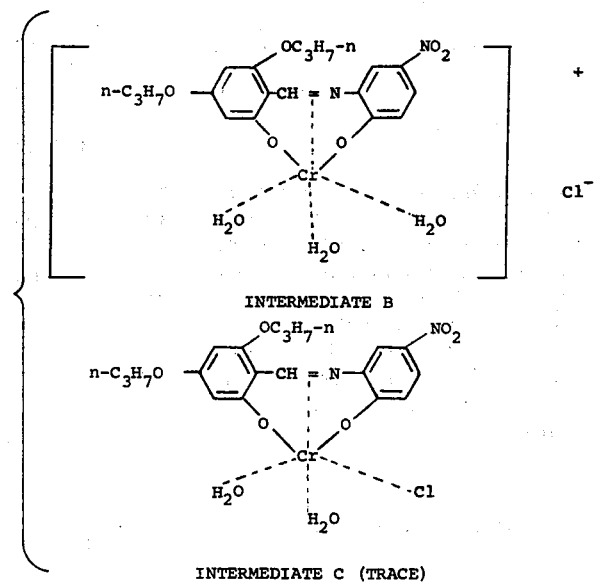

(VI)

A solution of 32.0 g. (0.12 m.) of chromic chloride hexahydrate in 250 ml. of N,N-dimethylformamide, and 200 ml. of cyclohexane was stirred under reflux in a 1-liter flask while water was azeotropically separated into a 50 ml. Dean-Stark trap. The solution changed color from green to purple. Refluxing was continued overnight. Approximately 38 ml. of water came over. The solution was brought to 90° C. and a solution of 25 g. (0.06 m.) of 2,4,6-tri-n-propoxybenzald-(2-oxy-5-nitrophenyl)imine (Formula 21) in 125 ml. of N,N-dimethylformamide (preheated on a steam bath to effect solution) was added over 1 hour with stirring. The stirred reaction mixture was kept at 90° C. for 12 hours. The reaction mixture was cooled to room temperature and added in a steady stream to 4 l. of water and 1 l. concentrated HCl. The product was filtered and dried at room temperature under vacuum, yielding 28.0 g. (97.5%) of a light brown solid. Thin layer chromatography showed the major component at R$_f$ 0.03 and trace spots at R$_f$ 0.36, 0.56, 0.75 and 0.93. The electrophoresis showed the main component at the cathode, a trace material at origin and a trace at the anode (35 mm.). Visible absorption:

| | | |
|---|---|---|
| MeCell λmax | 410 mμ | ε = 15,070; |
| MeCell λmax | 420 mμ | ε = 15,130; |
| MeCell λmax | 450 mμ | ε = 15,100. |

EXAMPLE 6

The following Example illustrates the chrome-complexing of an azomethine dye of Formula 21 with a chrome reagent prepared by dehydrating chromic chloride hexahydrate in the presence of N,N-dimethylacetamide.

A solution of 3.2 gms. (0.012 m.) of chromic chloride hexahydrate in 25.0 ml. of N,N-dimethylacetamide, and 20.0 ml. of cyclohexane was stirred under reflux while water was azeotropically separated into a Dean Stark trap. The solution changed color from green to purple. Refluxing was continued overnight. The solution was brought to 90° C. and a solution of 2.5 gms. (0.006 m.) of 2,4,6-tri-n-propoxybenzald(2-oxy-5-nitrophenyl)imine (Formula 21) in 25 ml. of N,N-dimethylacetamide (preheated on a steam bath to effect solution), was added over one hour with stirring. The stirred reaction mixture was kept at 90° C. for six hours.

The reaction mixture was then cooled to room temperature and added in a steady stream to 400 ml. of water and 100 ml. of concentrated HCl. The product was slurried with 9 gms. of Celite and filtered over a 6-gm. cake of Celite and dried at room temperature in vacuum oven, yielding 2.7 gms. (88%) of a light brown solid.

Paper chromatography and thin layer chromatography showed the product to be the desired chromed complex. Visible absorption:

| | | |
|---|---|---|
| MeCell λmax | 445 mμ | ε = 14,300; |
| MeCell λmax | 420 mμ | ε = 13,700; |
| MeCell λmax | 400 mμ | ε = 13,400. |

EXAMPLE 7

The following Example illustrates the chrome-complexing of an azomethine dye of Formula 21 with a chrome reagent prepared by dehydrating chromic chloride hexahydrate in the presence of hexamethylphosphoramide.

The procedures of Example 6 were followed, but hexamethylphosphoramide was substituted for dimethylacetamide. After eight hours at 90° C., a similar work-up gave 2.4 gms. (79%) of a light brown solid, with the same chromatographic characteristics as those described in Example 6. Visible absorption:

MeCell  
λmax    445 mμ    ε = 14,700;  
MeCell  
λmax    420 mμ    ε = 14,700;  
MeCell  
λmax    895 mμ    ε = 14,600.

The 1:1 chrome-complexed azomethine dyes produced in Examples 1–2 and 5–7 may be reacted with ligand developers or protected derivatives thereof to provide 1:1 chrome-complexed azomethine dye developers in accordance with the procedures disclosed in the aforementioned copending applications.

These ligands are β-hydroxy-α,β-unsaturated carbonyls containing a dihydroxyphenyl silver halide developing substituent, which may be represented by the following formulae:

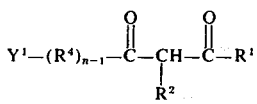

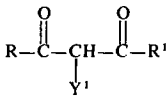

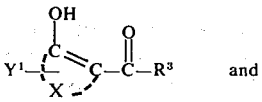 and

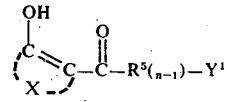

wherein $Y^1$ is a radical comprising a p-dihydroxyphenyl silver halide developer substituent or a protected derivative thereof.

Ligands within the above formulae, including illustrative examples thereof, are described and claimed in the copending application of Elbert M. Idelson, Ser. No. 881,323, filed Dec. 1, 1969, a continuation-in-part of application Ser. No. 487,054, filed Sept. 13, 1965 and now abandoned.

Oftentimes, where found desirable or expedient to do so, the developer moiety is present during the complexing reaction in its protected form, i.e., as a protected derivative wherein the hydroxyl groups of the developer moiety are replaced by protective groups. As examples of such protected derivatives, all of which are well known in the art, mention may be made of p-diacetoxy-phenyl, p-dibenzyloxyphenyl-p-dicathyloxyphenyl, etc., the last-mentioned being particularly preferred. Where the protected derivative is employed, conversion to the desired dihydroxyphenyl silver halide developing function may be readily accomplished by well known chemical means, e.g., hydrolysis with an alkaline material such as sodium hydroxide.

EXAMPLE 8

This Example illustrates the preparation of a chrome-complexed azomethine dye developer employing a chrome-complexed azomethine dye produced by the process of the present invention (Example 5).

A solution of 2.3 g. (0.0058 m.) of a ligand of the formula:

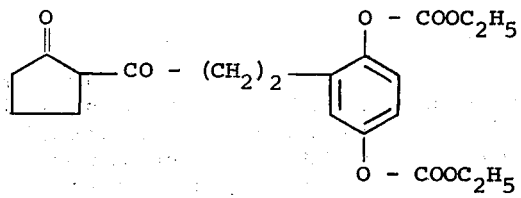

and 1.08 g. (1.39 ml., 0.0058 m.) of tri-n-butylamine in 20 ml. of methanol, was added dropwise over ten minutes to a refluxing solution of 3.0 g. (0.0058 m.) of the chromed dye prepared in Example 5, in 40 ml. of methanol. After the addition, reflux was continued for one hour. The reaction mixture was allowed to cool to about room temperature, and then was precipitated into a solution of 500 ml. of ice water and 15 ml. of concentrated hydrochloric acid. The precipitate was washed with 500 ml. of water, and then dried for 16 hours in vacuum at room temperature to yield a 1:1 chrome-complexed dye of the formula:

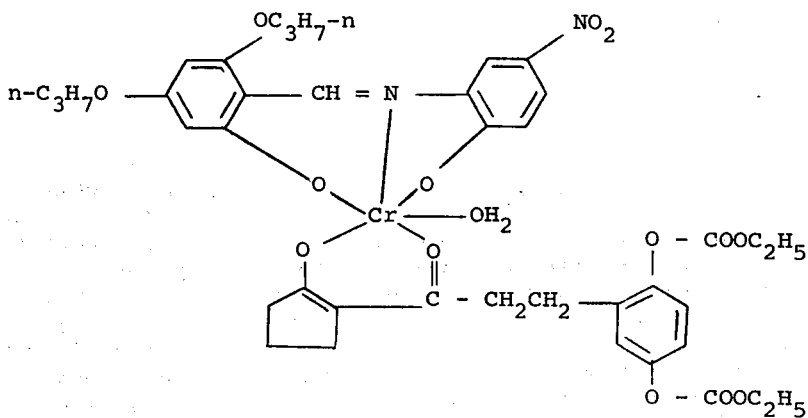

The resulting yellow solid weighed 4.57 g. (94.5% yield). The electrophoresis gave a major band at 0 mm., trace bands at the anode — 12 mm., and 38 mm., and a trace at the cathode at 31 mm. TLC showed two spots, $R_f = 0.03$ and 0.96. Visible absorption:

| MeCell λmax | 375 mμ | $\epsilon = 17,640$; |
|---|---|---|
| MeCell λmax | 415 mμ | $\epsilon = 17,400$; |
| MeCell λmax | 445 mμ | $\epsilon = 16,880$. |

A solution of 1.34 g. (0.0168 m.) of 50% w/w sodium hydroxide in 13 ml. of water, deaerated with nitrogen for 30 min., was added dropwise, over 20 min., to a similarly deaerated solution (with nitrogen for 30 min.) of 2.0 g. (0.0024 m.) of the above prepared chrome complex in 30 ml. of methyl cellosolve in an ice bath and with stirring. The solution was kept cold the remainder of the hour, then allowed to warm to room temperature and kept at room temperature for two hours. At this point a deaerated solution of 15 ml. of concentrated hydrochloric acid and 75 ml. of water was added over a 10 min. period. The precipitate was filtered, washed with a 1% hydrochloric acid solution and dried at room temperature in vacuum to a constant weight to yield a high quality 1:1 chrome-complexed dye of the following formula:

tate and stripped on an evaporator at 40° C., yielding 2.1 gms. (71%) of a dark brown solid.

Paper chromatography and thin layer chromatography showed the product to be the desired chrome complex. Visible absorption:

| MeCell λmax | 445 mμ; |
|---|---|
| MeCell λmax | 419 mμ; |
| MeCell λmax | 395 mμ. |

Liganding of this solid showed the desired blocked metallized yellow dye developer via paper chromatography and thin layer chromatography.

EXAMPLE 10

The following Example illustrates the chrome-complexing of 2,4,6-tri-n-propoxybenzald(2-oxy-5-nitrophenyl)imine (Formula 21) with a chrome reagent prepared by dehydrating chromic chloride hexahydrate in the presence of N,N-diethyl methylsulfinamide.

A solution of 3.2 g. (0.012 m.) of chromic chloride hexahydrate in 25 ml. of N,N-diethyl methylsufinamide and 20 ml. of benzene was stirred under reflux while water was azeotropically separated into a Dean-Stark trap. The solution changed color from dark green to purple. Refluxing was continued overnight. The solu-

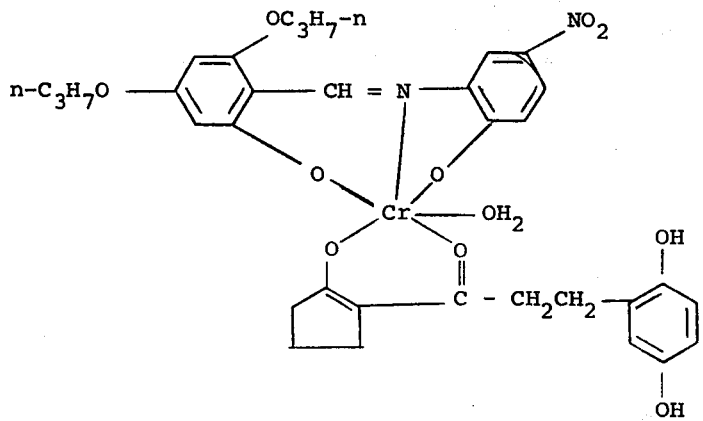

EXAMPLE 9

The following Example illustrates the chrome-complexing of 2,4,6-tri-n-propoxybenzald(2-oxy-5-nitrophenyl)imine (Formula 21) with a chrome reagent prepared by dehydrating chromic chloride hexahydrate in the presence of 2-pyrrolidinone.

A solution of 3.2 gms. (0.012 m.) of chromic chloride hexahydrate in 25 ml. of 2-pyrrolidinone, and 20 ml. of benzene was stirred under reflux while water was azeotropically separated into a Dean Stark trap. The solution changed color from dark green to light green. Refluxing was continued overnight. The solution was brought to 90° C. and a solution of 2.5 gms. (0.006 m.) of 2,4,6-tri-n-propoxybenzald(2-oxy-5-nitrophenyl)imine in 25 ml. of 2-pyrrolidinone (preheated on a steam bath to effect solution) was added over one hour with stirring. The stirred reaction was kept at 90° C. for 48 hours. The reaction was cooled to room temperature and added in a stream to 200 ml. of 10% hydrochloric acid. This was extracted with 50 ml. ethyl acetion was brought to 90° C. and a solution of 2.5 g. (0.006 m.) of 2,4,6-tri-n-propoxybenzald(2-oxy-5-nitrophenyl)imine in 2.5 ml. of N,N-diethyl methylsulfinamide (preheated on a steam bath to effect solution) was added over one hour with stirring. The stirred reaction was kept at 90° C. for 72 hours. The reaction was cooled to room temperature and added in a stream to 200 ml. of 10% hydrochloric acid. The resulting mixture was extracted with 50 ml. of ethyl acetate and the extract evaporated on a rotor evaporator at 40° C., yielding 2.3 g. (98%) of a dark oil.

Paper chromatography and thin-layer chromatography showed the product to be the desired chrome complex. Visible absorption:

| MeCell λmax | 400 mμ; |
|---|---|
| MeCell λmax | 420 mμ; |
| MeCell λmax | 445 mμ. |

Liganding of this oil showed the desired blocked metallized yellow dye developer via paper chromatography and thin-layer chromatography.

The following Examples 11 and 12 illustrate an especially preferred embodiment of the practice of the present invention wherein a ligand developer of the formula

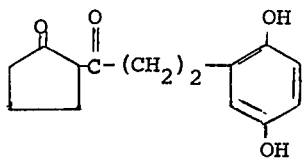

is reacted with chrome complexed dyes of the present invention.

EXAMPLE 11

A solution of 5.02 g. (0.0202 moles) of the ligand developer of the above formula and 4.8 ml. (0.02 mole) of tri-n-butyl amine in 80 ml. of methanol was added over 20 mins. to a refluxing solution of 10.26 g. (0.02 mole) of the chromed dye prepared as in Example 5. The mixture was kept for 1.5 hrs. at reflux, then cooled to room temperature and precipitated into 1.0 l. of 5% hydrochloric acid. The product was filtered and dried at 40°C. in vacuo. The dry MYDD weighed 13.3 g. (96.5% yield). $Ce^{+4}$ Titration: 95.8% $\lambda_{max}^{MeCell}$ 410 m$\mu$, $\epsilon = 19,040$; $\lambda_{max}^{MeCell}$ 440 m$\mu$, $\epsilon = 18,200$.

The metallized yellow dye developer produced corresponded to the following formula

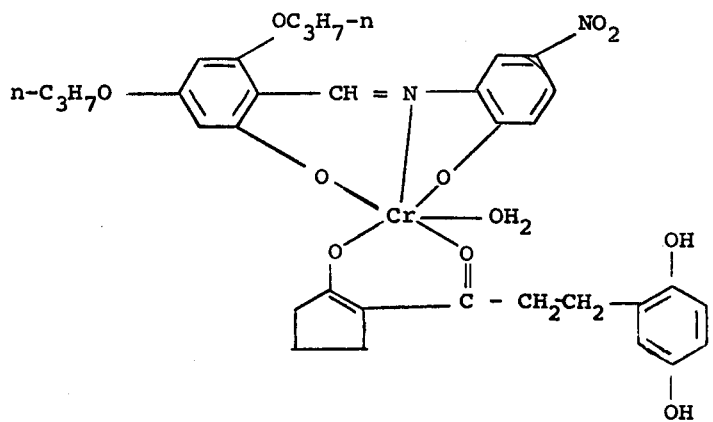

EXAMPLE 12

A solution of 5.3 g. (0.02 mole) of chromium chloride hexahydrate, in 30 ml. of N,N-dimethylformamide and 200 ml. of benzene, was stirred under reflux in a 500-ml. flask, while water was azeotropically separated into a 25-ml. Dean-Stark trap. Refluxing was continued for six hours; then 200 ml. of n-propanol was added, and the benzene was distilled over until the pot temperature reached 95°C. The 2,4,6-tri-n-propoxybenzald-(2-oxy-5-nitrophenyl) imine (Formula 21) (8.3 g., 0.02 mole) was added as a solid, and the mixture held at 95°C. for 12 hrs. After cooling to 65°C., a solution of 5.25 g. (0.021 mole) of the ligand developer used in Example 11 and 4.8 ml. (0.02 mole) of tri-n-butylamine in 40 ml. of n-propanol was added. The reaction mixture was stirred at 65°C. for two hours, then cooled to room temperature. The resulting solution was precipitated into 2 l. of 5% hydrochloric acid, filtered, and dried, yielding 13.7 g. (99.5% yield) of the metallized yellow dye developer of the formula shown in Example 11..

As shown in the foregoing Examples, in one aspect of the practice of the present invention, the chrome-containing compound is dehydrated in the presence of a dipolar solvent and the azomethine dye is directly added to the chroming reagent after dehydration. As mentioned before, the chrome reagent can be recovered after dehydration such as by precipitation or evaporation, and stored for prolonged periods of time before being used in the chrome-complexing reaction. A specific advantage of this aspect of the invention is that it permits the use of less expensive solvents such as alcohols as chrome-complexing reaction media. Also, mixtures of alcohols and dipolar solvents can be suitably employed as chrome-complexing solvent media. The following Example illustrates the use of a chroming reagent which had been recovered as a solid after dehydration and subsequently employed as a chrome-complexing reagent in an alcohol solvent medium.

EXAMPLE 13

4.19 g. (0.01 m.) of tris(N,N-dimethylacetamide) trichlorochromium (III) were added to 30 ml. of n-propanol and the solution was stirred on a steam bath at a temperature of 95° C. To this, a solution of 4.17 g. (0.01 m.) of 2,4,6-tri-n-propoxybenzald(2-oxy-5-nitrophenyl)imine in 30 ml. of n-propanol was added dropwise with stirring over one hour. The reaction was kept at 95° C. for 24 hours. The reaction was cooled to room temperature and added in a steady stream to 400 ml. of 10% hydrochloric acid. The resulting mixture was extracted with 100 ml. of ethyl acetate and evaporated on a rotor-evaporator at 40° C., yielding 4.12 g. (81%) of a dark solid.

Thin-layer chromatography showed a major spot at $R_f = 0.00$ of the desired complex; visible absorption:

| | |
|---|---|
| MeCell $\lambda$max | 445 m$\mu$; |
| MeCell $\lambda$max | 420 m$\mu$; |
| MeCell $\lambda$max | 390 m$\mu$. |

The following Example illustrates a preferred method for preparing the 2,4,6-tri-n-propoxybenzald(2-oxy15-nitrophenyl)imine employed in Examples 3–11.

EXAMPLE 14

A solution of 4.50 g. (95.6%; 0.0279 mole) of 2-amino-4-nitrophenol in 125 ml. of methanol was added at room temperature over a 1.5 hour period to a vigorously stirred solution of 8.40 g. (93.64% by v.p.c.; 0.0279 mole) of 2,4,6-tri-n-propoxybenzaldehyde in 125 ml. of methanol kept under nitrogen. Stirring was continued for 18 hours with exclusion of moisture, the mixture was filtered, and the solid washed with 60 ml. methanol, yielding 12.8 g. (92.0% theory) of red-brown crystals, m.p. 150°–151.5° C.

From the foregoing description and illustrative Examples, it will be seen that the present invention provides a novel, improved method for preparing the 1:1 chrome-complexed azomethine dyes of the type described and claimed in the aforementioned copending application Ser. No. 830,480.

Since certain changes may be made in the above product and process without departing from the scope of the invention herein involved, it is intended that all matter contained in the above description shall be interpreted as illustrative and not in a limiting sense.

What is claimed is:

1. A process for producing a chrome-complexed azomethine dye which comprises the step of chrome-complexing an azomethine dye of the formula:

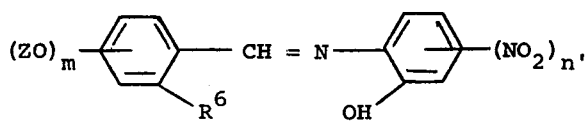

wherein Z is hydrogen or an alkyl radical containing from 1–8 carbon atoms, m and n' are the integers 1 or 2 and $R^6$ is OH or alkoxy containing from 1–8 carbon atoms; with a chroming reagent prepared by dehydrating a chrome-containing compound in the presence of a dipolar solvent of the formulae:

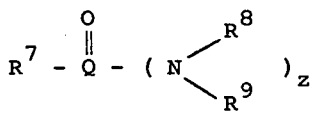

or

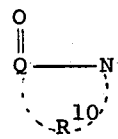

wherein $R^7$ is hydrogen or alkyl having from 1–8 carbon atoms; Q is carbon, phosphorus or sulfur; $R^8$ and $R^9$ are hydrogen, alkyl or aryl and can be the same or different; z is the integer 1, 2 or 3; and $R^{10}$ represents the carbon atoms necessary to complete a 5 or 6 membered ring.

2. A process of claim 1 wherein said azomethine dye conforms to the formula:

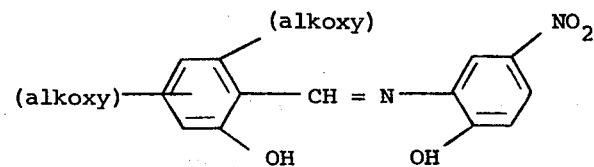

wherein alkoxy comprises 1–8 carbon atoms.

3. A process of claim 1 wherein said azomethine dye conforms to the following formula:

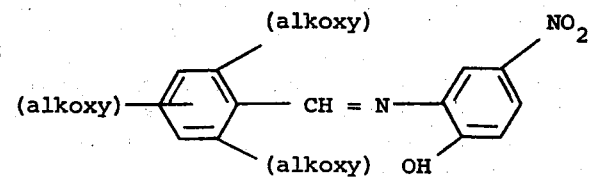

wherein alkoxy comprises 1–8 carbon atoms.

4. A process of claim 1 wherein said azomethine dye is:

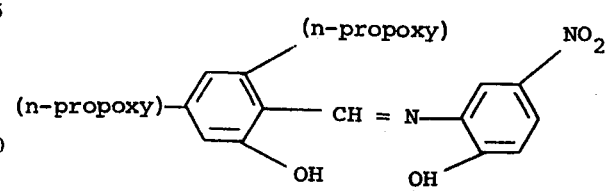

5. A process of claim 1 wherein said azomethine dye is:

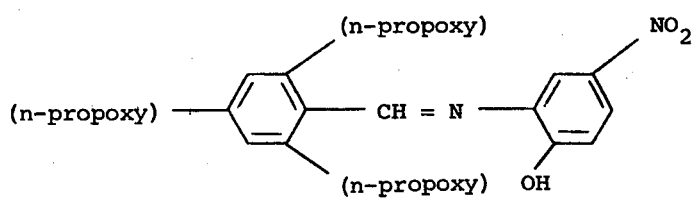

6. A process of claim 1 wherein said chrome compound is a hydrated chrome salt of the formula:

Cr A₃ wherein A is halogen, nitrate, acetate, oxalate, oxide, orthophosphate, sulfate, sulfite and tartrate.

7. A process of claim 6 wherein said azomethine dye is:

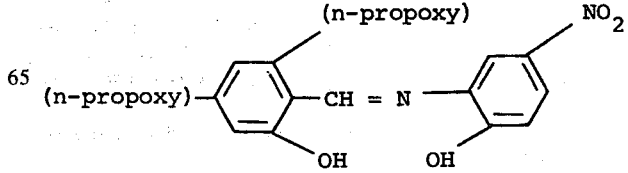

said hydrated chrome salt is chromic chloride hexahydrate and said solvent is selected from the group consisting of dimethylformamide, dimethylacetamide, 2-pyrrolidinone, 1-methyl-2-pyrrolidone, 2-piperidone, 1-methyl-2-piperidone, hexamethyl-phosphoramide, N,N-diethyl methylsulfinamide and mixtures of these.

8. A process of claim 6 wherein said azomethine dye is:

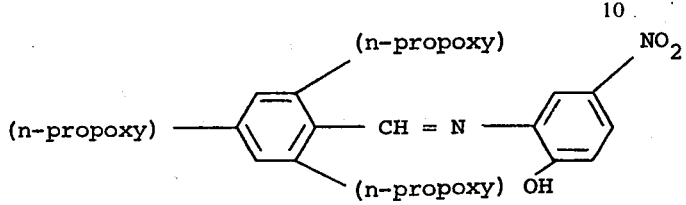

said hydrated chrome salt is chromic chloride hexahydrate and said solvent is selected from the group consisting of dimethylformamide, dimethylacetamide, 2-pyrrolidinone, 1-methyl-2-pyrrolidone, 2-piperidone, 1-methyl-2-piperidone, hexamethylphosphoramide, N,N-diethyl methylsulfinamide and mixtures of these.

9. A process of claim 1 including the step of reacting the produced chrome-complexed azomethine dye with a ligand containing a p-dihydroxyphenyl substituent or protected derivative thereof to produce a 1:1 chrome-complesed azomethine dye chrome-complexed 10. A process of claim 1 including the step of reacting the produced chrome-complexed azomethine dye with a ligand within the formulae:

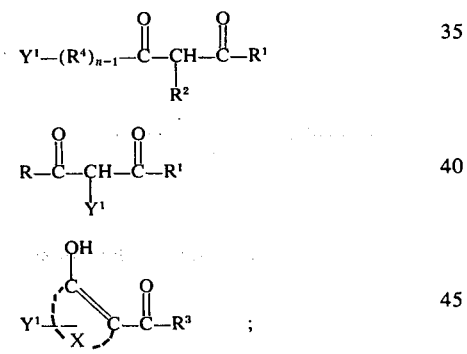

and

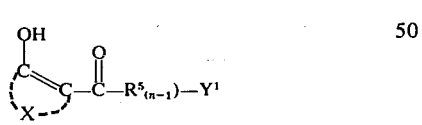

wherein R and $R^1$ each are lower alkyl, lower alkoxyalkyl, lower fluoroalkyl, lower alkylamino, phenyl or phenylamino; $R^2$ is hydrogen, lower alkyl or phenyl; $R^3$ is lower alkyl, hydroxy or hydrogen; $R^4$ is lower alkylene, phenylene or phenylamino; $R^5$ is lower alkylene; $Y^1$ is a radical comprising a p-dihydroxyphenyl silver halide developer substituent or a hydrolyzable protected derivative thereof; X represents the atoms necessary to complete a five or a six member aliphatic ring or a benzene ring; and n is a positive integer from 1–2.

11. A process of claim 1 which comprises the steps of:

a. chrome-complexing an azomethine dye of the formula:

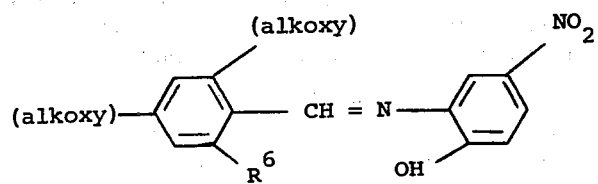

wherein alkoxy contains 1–8 carbon atoms and $R^6$ is OH or alkoxy; with said chroming reagent to provide a chrome-complexed azomethine dye of the formula:

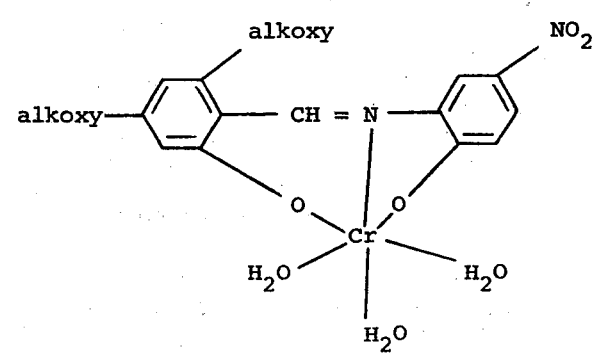

b. reacting said chrome complex with a ligand of the formula:

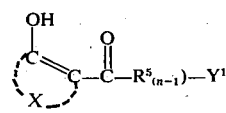

to form a 1:1 chrome complex of the formula:

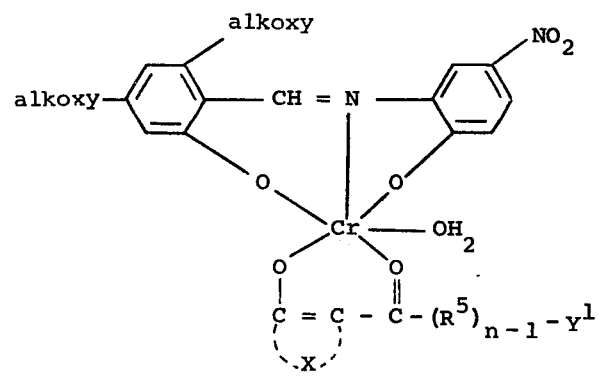

wherein each alkyl moiety contains 1–8 carbon atoms and is the same; $n'$ is 1 or 2; X represents the atoms necessary to complete a five or six member aliphatic ring or a benzene ring; $R^5$ is lower alkylene; n is 1 or 2; $Y^1$ is a radical comprising a hydrolyzable protected p-dihydroxyphenyl silver halide developer substituent; and Y is a radical comprising a p-dihydroxyphenyl silver halide developer substituent or a hydrolyzable protected derivative thereof.

12. A process of claim 11 wherein said ligand is

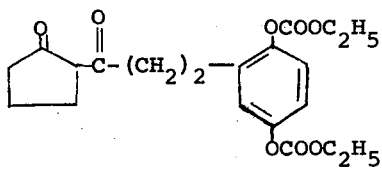

13. A process of claim 11 wherein said ligand is

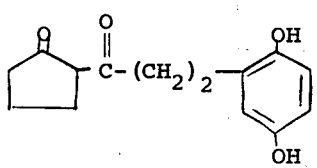

14. A process for chrome-complexing an azomethine dye of the formula:

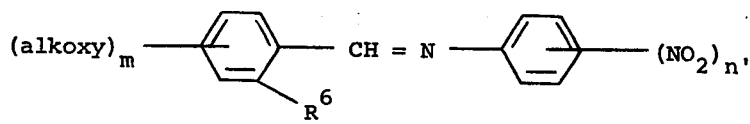

wherein each alkoxy is the same and contains 1–8 carbon atoms, $R^6$ is OH or alkoxy and $m$ and $n'$ are an integer from 1 to 2, which comprises the step of reacting said dye with a chroming reagent prepared by dehydrating a hydrated chrome salt of the formula:
$Cr A_3$
wherein A is halogen, nitrate, acetate, oxalate, oxide, orthophosphate, sulfate, sulfite and tartrate in the presence of a dipolar solvent which conforms to the formulae:

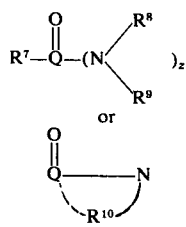

wherein $R^7$ is hydrogen or alkyl having from 1–8 carbon atoms; Q is carbon, phosphorus or sulfur; $R^8$ and $R^9$ are hydrogen, alkyl or aryl and can be the same or different; z is the integer 1, 2 or 3; and $R^{10}$ represents the carbon atoms necessary to complete a 5 or 6 membered ring.

15. A process of claim 14 wherein said azomethine dye conforms to the formula:

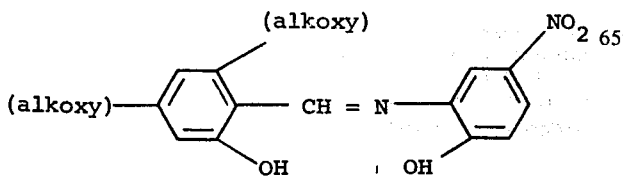

wherein alkoxy contains from 1–8 carbon atoms.

16. A process of claim 14 wherein said azomethine dye conforms to the following formula:

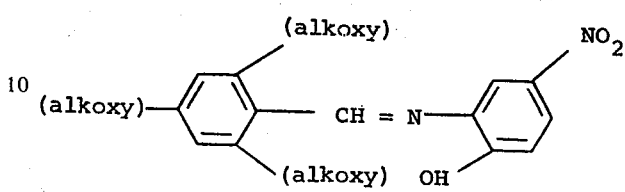

wherein alkoxy comprises 1–8 carbon atoms.

17. A process of claim 14 wherein said azomethine dye is:

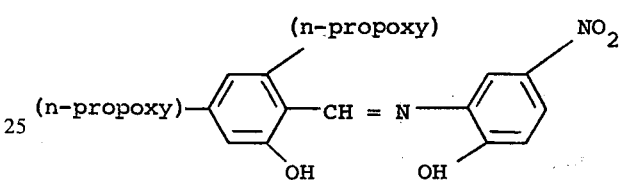

18. A process of claim 14 wherein said azomethine dye is:

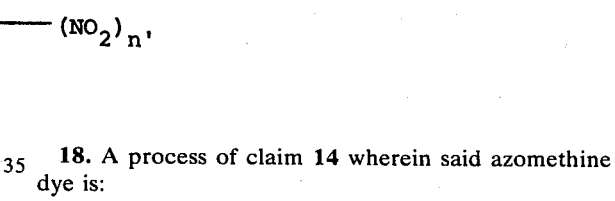

19. A process of claim 14 wherein said chrome salt is chromic chloride hexahydrate and said solvent is selected from the group consisting of dimethylformamide, dimethylacetamide, 2-pyrrolidinone, 1-methyl-2-pyrrolidinone, 2-piperidone, 1-methyl-2-piperidone, hexamethylphosphoramide, N,N-diethyl methylsulfinamide and mixtures of these.

20. A process of claim 14 including the step of reacting the produced chrome-complexed azomethine dye with a ligand within the formulae:

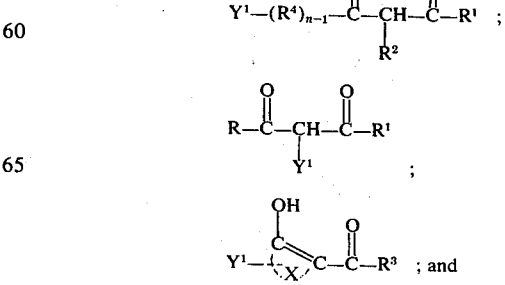

—Continued

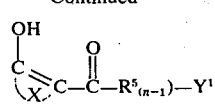

wherein R and $R^1$ each are lower alkyl, lower alkoxyalkyl, lower fluoroalkyl, lower alkylamino, phenyl or phenylamino; $R^2$ is hydrogen, lower alkyl or phenyl; $R^3$ is lower alkyl, hydroxy, or hydrogen; $R^4$ is lower alkylene, phenylene or phenylamino; $R^5$ is lower alkylene; $Y^1$ is a radical comprising a p-dihydroxyphenyl silver halide developer substituent or a hydrolyzable protected derivative thereof; X represents the atoms necessary to complete a five or a six member aliphatic ring or a benzene ring; and n is a positive integer from 1–2.

21. A process of claim 20 which comprises the steps of:

a. reacting an azomethine dye of the formula:

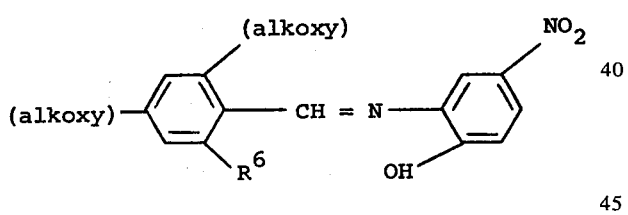

wherein alkoxy contains 1–8 carbon atoms and $R^6$ is OH or alkoxy; with a chroming reagent prepared by dehydrating chromic chloride hexahydrate in a dipolar solvent chosen from the group consisting of dimethylformamide, dimethylacetamide, 2-pyrrolidinone, 1-methyl-2-pyrrolidinone, 2-piperidone, 1-methyl-2-piperidone, hexamethylphosphoramide, N,N-diethyl methylsulfinamide, or mixtures of these to provide a chrome-complexed azomethine dye of the formula:

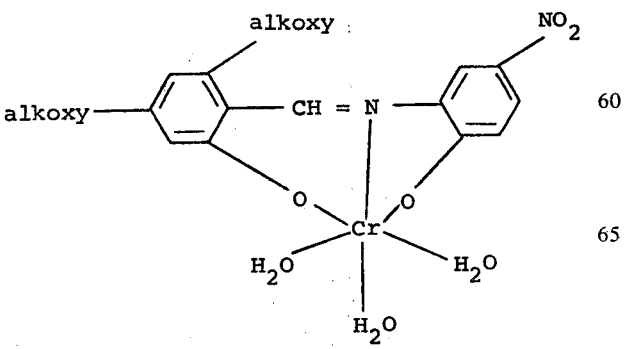

b. reacting said chrome complex with a ligand of the formula:

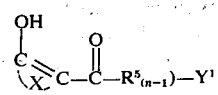

to form a 1:1 chrome complex of the formula:

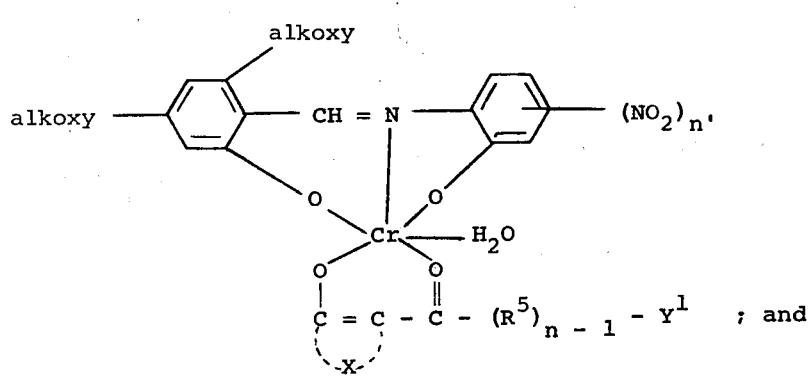

wherein $R^5$ is lower alkylene, $Y^1$ is a radical containing a p-dihydroxyphenyl silver halide developer substituent or a hydrolyzable protected derivative thereof.

22. A process of claim 21 wherein said ligand is

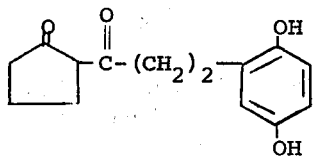

23. A process of claim 21 wherein said ligand is

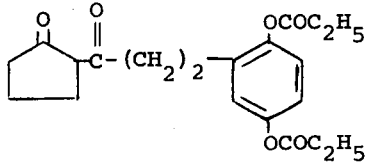

24. A process which comprises the steps of chrome-complexing an azomethine dye of the formula:

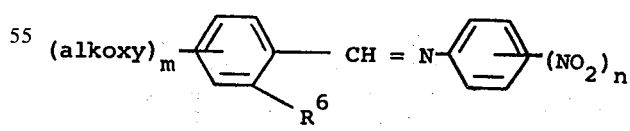

wherein each alkoxy is the same and contains 1–8 carbon atoms, $R^6$ is OH or alkoxy and $m$ and $n'$ are an integer from 1 to 2, by reacting said dye with a chroming reagent prepared by dehydrating a hydrated chrome salt of the formula:

$Cr A_3$ wherein A is halogen, nitrate, acetate, oxalate, oxide, orthophosphate, sulfate, sulfite and tartrate in the presence of a dipolar solvent which conforms to the formulae:

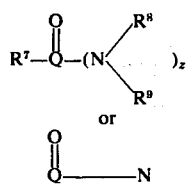
or wherein $R^7$ is hydrogen or alkyl having from 1–8 carbon atoms; Q is carbon, phosphorus or sulfur; $R^8$ and $R^9$ are hydrogen, alkyl or aryl and can be the same or different; z is the integer 1, 2 or 3; and $R^{10}$ represents the carbon atoms necessary to complete a 5 or 6 ring and, reacting said chrome complex with a ligand of the formula:

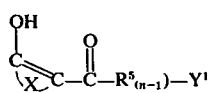

to form a 1:1 chrome complex of the formula:

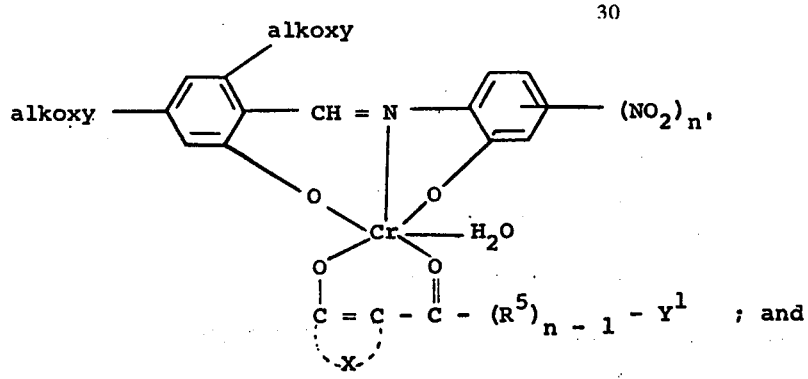

wherein $R^5$ is lower alkylene, $Y^1$ is the radical

or

25. A process of claim 24 wherein said chrome salt is chromic chloride hexahydrate and said solvent is selected from the group consisting of dimethylformamide, dimethylacetamide, 2-pyrrolidinone, 1-methyl-2-pyrrolidinone, 2-piperidone, 1-methyl-2-piperidone, hexamethylphosphoramide, N,N-diethyl methylsulfinamide and mixtures of these.

26. A process of claim 24 wherein said azomethine dye conforms to the formula:

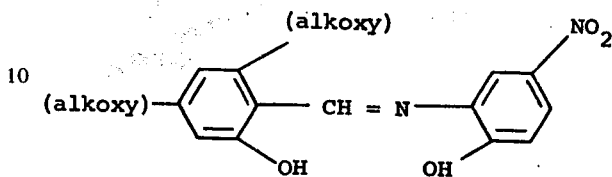

wherein alkoxy contains from 1–8 carbon atoms.

27. A process of claim 24 wherein said azomethine dye conforms to the following formula:

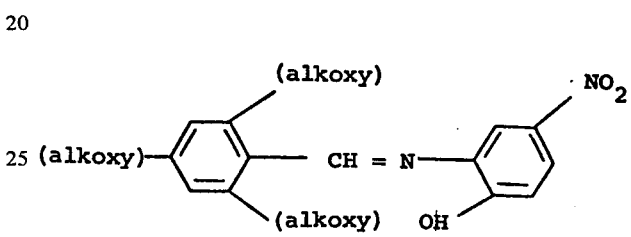

wherein alkoxy comprises 1–8 carbon atoms.

28. A process of claim 24 wherein said azomethine dye is:

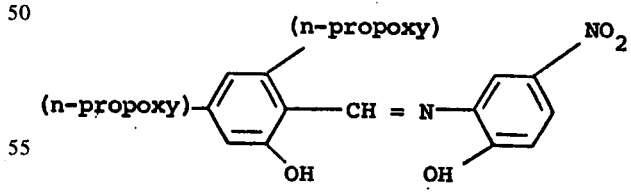

29. A process of claim 24 wherein said azomethine dye is:

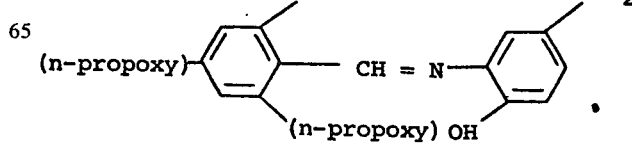

30. A process of claim 24 wherein said ligand is:
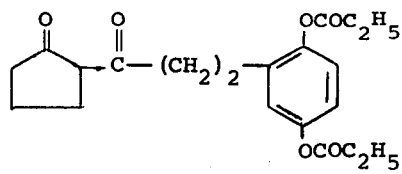
31. A process of claim 24 wherein said ligand is:
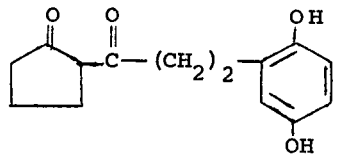
* * * * *